United States Patent
Wechsler (10) Patent No.: US 7,971,556 B2
(45) Date of Patent: Jul. 5, 2011

(54) DOG TOY AND INTERACTIVE PLAY METHOD

(76) Inventor: Lawrence I. Wechsler, Great Neck, NY (US)

( * ) Notice: Subject to any disclaimer, the term of this patent is extended or adjusted under 35 U.S.C. 154(b) by 0 days.

(21) Appl. No.: 10/760,147

(22) Filed: Jan. 16, 2004

(65) Prior Publication Data

US 2004/0211369 A1 Oct. 28, 2004

(51) Int. Cl.
*A01K 29/00* (2006.01)
(52) U.S. Cl. .......................................... 119/711; 119/707
(58) Field of Classification Search .................. 119/707, 119/702, 708, 709, 710, 711; D30/160; D21/707, D21/713; 446/85, 431; 473/596, 597, 612
See application file for complete search history.

(56) References Cited

U.S. PATENT DOCUMENTS

| | | | | |
|---|---|---|---|---|
| 3,671,039 A | * | 6/1972 | Niewolak | 273/317.9 |
| 4,924,811 A | * | 5/1990 | Axelrod | 119/710 |
| D312,102 S | * | 11/1990 | Klitsner | D21/408 |
| 5,092,272 A | * | 3/1992 | O'Rourke | 119/709 |
| D348,915 S | * | 7/1994 | Fraser | D21/707 |
| D368,502 S | * | 4/1996 | Liao | D21/707 |
| D372,749 S | * | 8/1996 | Klundt | D21/707 |
| D408,482 S | * | 4/1999 | Morrison | D21/708 |
| D475,487 S | * | 6/2003 | DeAngelis | D30/160 |
| 6,651,590 B2 | * | 11/2003 | Willinger et al. | 119/707 |
| D493,579 S | * | 7/2004 | DeAngelis | D30/160 |

\* cited by examiner

*Primary Examiner* — T. Nguyen (57) ABSTRACT

An animal toy includes structure presenting regions having characteristics providing different degrees of animal interest and/or accessibility, such that there is a higher likelihood that a dog will retain a particular part of the toy in its mouth apart from another region intended for grasping by the owner. The toy finds application in various modes of play, including tug activities between dog and owner, throwing and retrieval, and any other type of interaction in which the toy is held by the dog in its mouth and is thereby subjected to a depositing of saliva over the particular involved region of the toy. An embodiment includes members which include animal access regions and which are disposed in circumferentially spaced apart positions about a toy axis and radially spaced apart therefrom, and at least partially shielded handles, portions of which are positioned radially inward of a outermost radial extent of said members. Exposure to saliva by a user is reduced by avoided contact with the region accessed to a greater degree by the animal during play.

23 Claims, 5 Drawing Sheets

DOG TOY AND INTERACTIVE PLAY METHOD

BACKGROUND OF THE INVENTION

The present invention relates to a dog toy, and more particularly to a toy for use in interactive play between dog and owner.

Interactive play between a dog and its owner is widely enjoyed by many as a recreational diversion and for providing a dog with needed exercise. Many tug and fetch toys are available which adequately meet this need, and come in a wide range of shapes, sizes and designs. Perhaps the simplest of these toys is the common tennis ball, which has been used alone, or in combination with other structures, for example, serving as fixed end portions of an elongated fetch stick, as disclosed for example in U.S. Pat. No. 6,216,640 or attached to a looped handle as disclosed for example in U.S. Pat. No. 5,961,406. Although adequately permitting a user to throw it some distance and allowing a dog to grab the toy in its mouth for retrieval thereof, due to the physical nature of such toys it is impossible to predict what portion of the toy the dog will select to hold in its mouth when picking up the toy after it has been thrown. Consequently, over the course of play, saliva of the dog will likely accumulate on all portions of the fetch article, including that portion or those portions gripped by the user when taken from the dog's mouth and thrown again. The attendant transfer of saliva from the toy to the hand may consequently detract from the appeal of such interactive play for certain individuals, and potentially discourage some from engaging in such activities.

It would therefore be desirable to provide a toy which, by virtue of its design, would reduce or substantially eliminate the exposure of a user to saliva deposited thereon by a dog, particularly during interactive play.

Accordingly, it is an object of the invention to provide a dog toy which overcomes the drawbacks of the prior art.

It is a further object of the invention to provide a dog toy which effectively insulates the dog owner from contact with the saliva of the dog deposited on the toy during play.

It is still a further object of the invention to provide a dog toy which can be readily picked up from the ground in the mouth of a dog and which can be easily held in the hand by a user.

It is yet a further object of the invention to provide a method of using a toy directed to interactive play which minimizes exposure of a dog owner to saliva of the dog deposited thereon over time.

SUMMARY OF THE INVENTION

In accordance with these and other objects of the invention, there is provided a dog toy which effectively shields a dog owner from contact with saliva of the dog which accumulates on the toy during interactive play.

Briefly stated, a dog toy is comprised of structure presenting regions providing different degrees of animal interest and/or accessibility, such that there is a higher likelihood that a dog will retain a particular part of the toy in its mouth apart from another region intended for grasping by the owner. A toy employing such concept will find application in various modes of play, including tug activities between dog and owner, throwing and retrieval, and any other type of interaction in which the toy is held by the dog in its mouth and is thereby subjected to a depositing of saliva over the particular involved region of the toy and later subject to transfer to a user's hand. For purposes of disclosure, a region of the structure of the toy which a dog is more likely to bite and hold with its mouth by virtue of either enhanced sensory attraction and/or greater relative physical accessibility is referred to by the term "animal access region." Conversely, a region or regions which are less likely to be accessed by the pet during play by reason of less sensory appeal and/or structural inaccessibility are referred to by the term "animal restricted region."

In accordance with an embodiment of the invention, a toy designed for particular application as a fetch toy, i.e., thrown by the user and retrieved by the dog, is advantageously of elongated dimension and formed of suitable material. The structural shape defining the toy includes a bar defining an elongated central region and a pair of handles surrounded by shields disposed adjacent to opposed terminal ends thereof. The shields may be of any suitable shape which restricts access by the animal to the handles, yet allows grasping thereof by a user inserting a hand into the inner region of shields. Conveniently, the shields are, for example, generally cup-shaped, having open ends arranged to face outwardly in a direction along the longitudinal axis. The openings in the shields are advantageously of sufficient size to permit a hand to be inserted and to grasp the handle disposed therein, and yet advantageously still small enough to discourage a dog from trying to insert its snout in an attempt to bite the handle or the shield walls. The elongated central region, which serves to provide the animal access region is advantageously appropriately dimensioned to be comfortably receivable between the jaws of a dog. As will be readily apparent to one of ordinary skill in the art, the shielded handles serve as animal restricted regions. Conveniently, in particular from the standpoint of manufacture, the handles can simply be axial extensions of the elongated central region extending between the shields, and having either the same, greater or lesser diameter for comfortable grasping by the user. During use, the user simply grabs either of the shielded handles and throws the toy as one would throw a stick or the like. When retrieving the toy, the dog is presented with the elongated central region which is elevated above the ground by the greater diameter shields disposed at opposed ends of the toy which serves to support same on the ground, and the dog is therefore most likely to pick the toy up by the elongated central region which serves as the animal access region.

In another embodiment according to the invention, a toy includes a series of members (preferably at least three) having a longitudinal dimension running co-directionally with a central axis of the toy, and which are circumferentially spaced-apart about the central axis and having at least structural portions located radially outward from the central axis. In a particularly advantageous variant of this embodiment radially outermost edges of the members are shaped to correspond with a spherical envelope. At least one hand-grasping region (more advantageously two) is provided, advantageously through which the central axis passes, more advantageously in the form of a rod-shaped handle (or more advantageously two generally rod-shaped handles) longitudinally aligned with the central axis. Each of the members and the handle(s) are mutually secured, either by integral molding or fabrication, or assembly. Radially outward portions of the members are extended outward from a center of the toy in the axial direction such that they extend past an axial position of an inwardmost end of the handle, thereby at least partially shielding the handle or handles, such that the handles serve as the animal restricted regions. In a preferred case, two handles disposed in opposed positions along the central axis are provided, and terminal ends of the members extend approximately to an axial position corresponding to outwardly facing terminal ends of the handles. In this embodiment, the circumferentially spaced-apart members present animal access regions. As noted above, gripping regions need not be in the form of formal handle structure, but rather can simply be comprised of a hand-retainable region accessible by a hand of a user, which region is at least partially shielded by the terminal end structure of the members which serve as providing the animal access regions. Moreover, alternative to a rod-like handle, any number of other suitable configurations can be used in satisfactory manner. For example, in accordance with another variant of this embodiment, a rope can be made to extend through the toy, for example, along the central axis, and ends of the rope, then could be used as a handle by the user.

Various other toy designs embodying the principles of the invention can utilize any desired shape suitably incorporating structure including two regions each having a respective characteristic or characteristics eliciting different degrees of animal interest and/or accessibility without departure from the intended scope of the invention described herein. These can be directed not only to fetch type play, by also tug activity and/or any other human/animal interactive play.

The above, and other objects, features and advantages of the present invention will become apparent from the following description read in conjunction with the accompanying drawings.

DETAILED DESCRIPTION OF THE PREFERRED EMBODIMENT

A toy in accordance with the invention is intended herein to broadly embrace any and all suitable structural configurations providing at least two regions, each of which, due to differing physical characteristics of the regions themselves or by virtue of positional placement of other structure of the toy, is accessed to a relatively greater or lesser degree by a dog when picking up the toy in its mouth. It will be understood that such suitable structural configurations are not intended herein to be limited to any precise shape or size, and selection of such parameters in the practice of the invention will often be dictated by design preference, and preferred manner and ease of gripping of the toy by both the user and the dog. The characteristics referred to above which control the respective relative degrees of animal interest in picking up the toy by one region or another may be sensory-based, i.e., involving such factors as smell, taste, appearance, surface feel, hardness, etc., and/or may be a structural feature which physically inhibits or discourages access by a dog's mouth to a given one of the regions designed to be held by a user and therefore intended to be accessed to a lesser relative degree by the dog or other animal.

Figure 1:
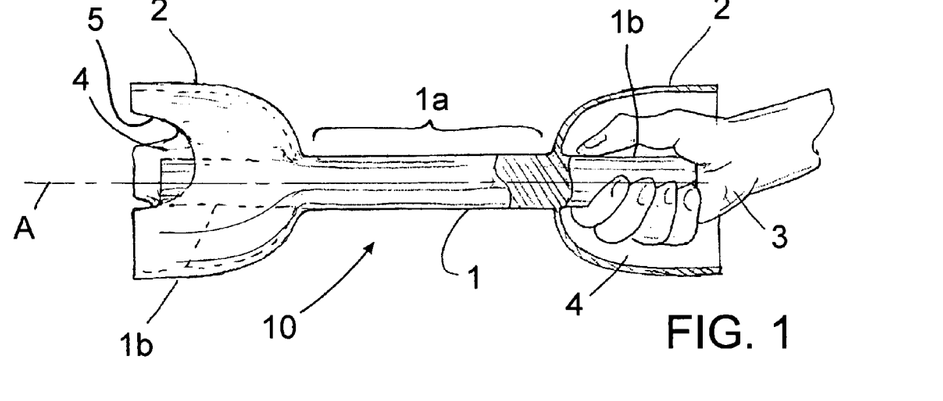
FIG. 1 is a side elevation of an embodiment of a toy in accordance with the invention particularly well adapted for use as a fetch toy.
Figure 2:
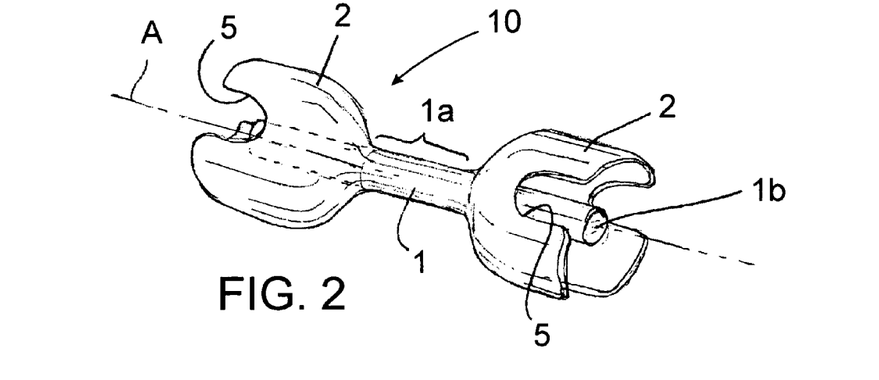
FIG. 2 is a perspective view of the embodiment of FIG. 1.

Referring now to the figures, FIGS. 1 and 2 depict an embodiment of the toy in accordance with the invention, generally designated 10. In accordance with the illustrated example, toy 10 is structurally of elongated dimension and presents a general shape visually reminiscent of a bone, i.e., having the appearance of enlarged end portions relative to a narrower central portion extending therebetween. As shown in the figures, toy 10 includes a bar 1 comprising a central region 1a and opposed end regions defining two handles 1b. A pair of shields 2 are disposed along the bar 1 in a position adjacent to the opposed ends thereof. Shields 2 may be configured in any suitable shape which effectively restricts or inhibits access by the mouth of the animal to the handles 1b, yet allows grasping thereof by a user inserting a hand 3 into an inner region 4 of shields. Conveniently, the shields 2 are, for example as shown, cup-shaped, having open ends arranged to face outwardly in a direction along a longitudinal axis A, and as further shown, advantageously extend past terminal ends of handles 1b. The openings in the shields 2 are preferably of sufficient size to permit the hand 3 to be inserted and to grasp the handle 1b disposed therein, and yet advantageously still small enough to discourage a dog from trying to insert its snout in an attempt to bite the handle 1b or the walls of the shield 2. The shield can optionally include cutouts 5, for example, to reduce wind resistance when thrown or just simply to give the toy 10 a more attractive appearance. The elongated central region 1a, which serves to provide the animal access region, is advantageously appropriately dimensioned to be comfortably receivable between the jaws of a dog and can, if so desired, be textured, patterned, flavored, covered by any suitable material, etc., to further enhance animal appeal. The handles 1b, by virtue of being at least partially shrouded by shields 2, serve to provide animal restricted regions. Conveniently, in particular from the standpoint of manufacture and as shown in the example of FIGS. 1 and 2, the handles 1b are simply axial extensions of the elongated central region 1a extending between the shields 2, and having either the same, greater or lesser diameter for comfortable grasping by the user. During use, the user simply grabs either of the shielded handles 1b and throws the toy 10 as one would throw a stick or the like. When retrieving the toy 10 from the ground after the toy 10 is thrown, the dog is presented with the elongated central region 1a which is elevated above the ground by the greater diameter shields 2 disposed at opposed ends of the toy 10 which serve to support same on the ground, and the dog is therefore most likely to pick the toy up by the animal access region presented by elongated central region 1a.

It is noted that, although the particular example described above employs two handles 1b, only one gripping region, conveniently in the form of a suitable handle structure, need be provided at one position of the toy 10 in accordance with an embodiment of the invention.

Figure 3A:
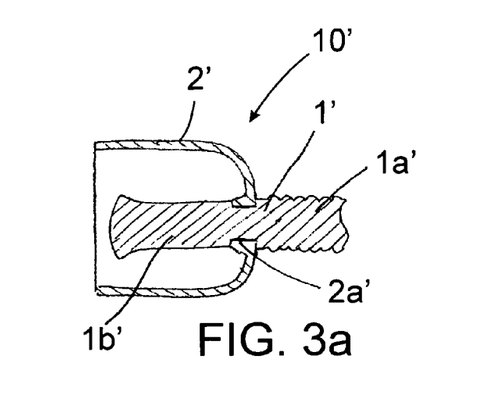
FIG. 3a is a partial side view in cross-section illustrating a fabrication example of the basic embodiment of FIG. 1.
Figure 3B:
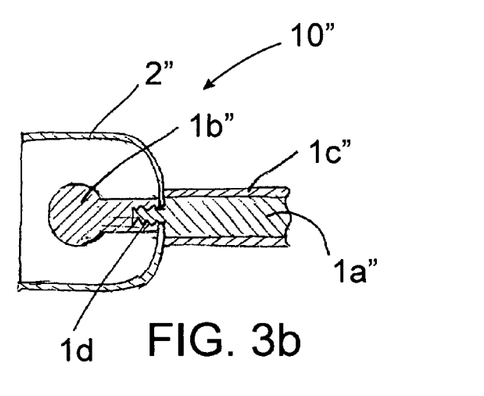
FIG. 3b is a partial side view in cross-section illustrating another fabrication example of the basic embodiment of FIG. 1.

The embodiment shown in FIGS. 1 and 2 is conveniently an integral structure, produced as one piece, for example, in practice, by injection molding or other suitable process. However, if so desired, the toy (including embodiments later described herein or others made in accordance with practice of the invention) may be comprised of an assembly of parts, for example in instances where injection molding of a unified toy is not a practical option, or where it is desired that the toy have different physical characteristics over different regions to achieve the objectives of the invention (i.e., to provide, for example, varying sensory-based stimulus) or simply to provide a more visually appealing or comfortable feel for consumers at point of purchase and/or during use. FIGS. 3a and 3b illustrate merely two examples of the virtually limitless possibilities for such assemblies, as will be apparent to one skilled in the art.

Referring to FIG. 3a, a toy 10' is comprised of a rod 1' which includes a handle 1b' and a central region 1a' molded as an integral unit. A shield 2' is made of a resilient material stretchable to a degree sufficient to permit assembly by slidable reception of the shield past the handle 1b' thereby to allow a reception portion 2a' of the shield 2' to be captively received in a groove formed in the rod 1' at an axial juncture of the handle 1b' and the central region 1a' when an applied stretching force is relieved.

Turning now to FIG. 3b, a toy 10'' includes a central member 1a'' made, for example, of a moderately rigid or shape-retaining material, and an outer sleeve 1c'' of a softer, and optionally, absorbent material, such as a pile, woven fabric, carpet-like material, etc.

Figure 4:
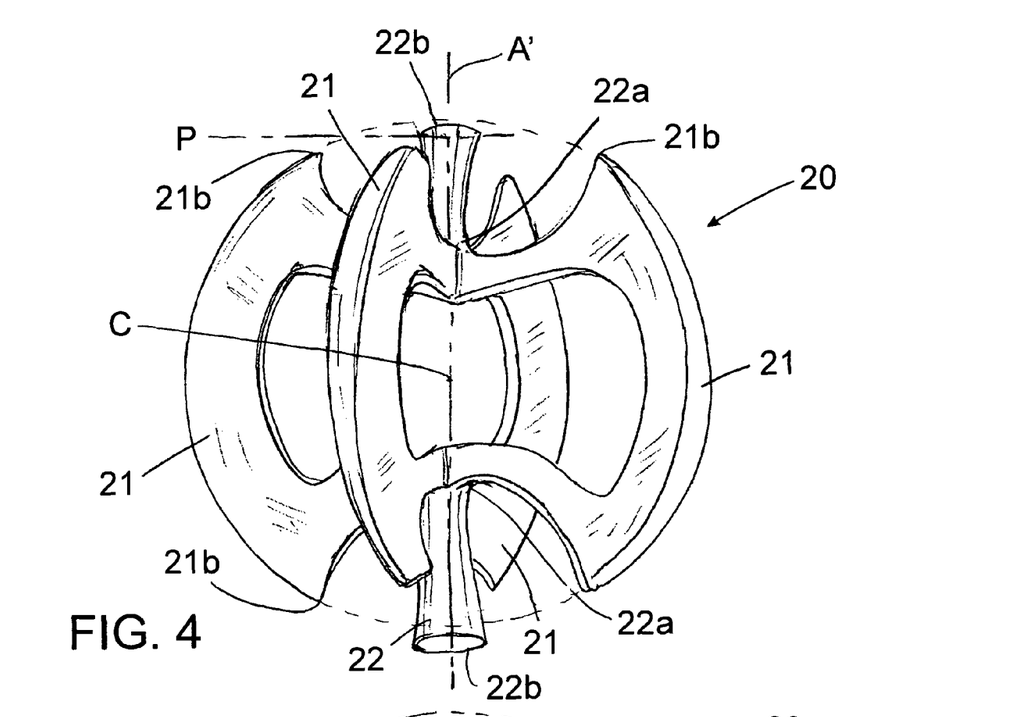
FIG. 4 is a side perspective view of another embodiment of a toy in accordance with the invention particularly well adapted for use as an animal fetch toy.
Figure 5:
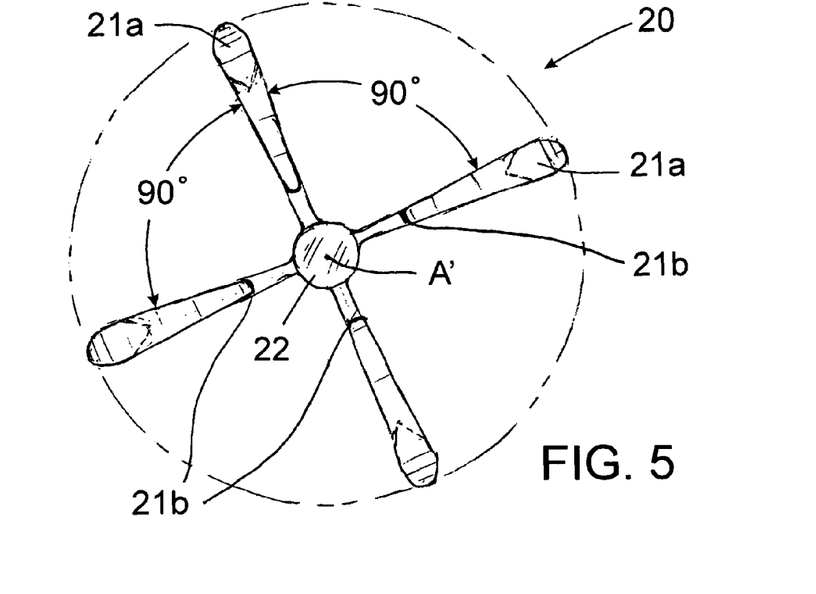
FIG. 5 is an end view of the embodiment of FIG. 4.

Referring now to FIGS. 4 and 5, another embodiment of a toy is depicted, generally designated as numeral 20. Toy 20 includes a series of members 21 (preferably at least three, and in the depicted example of FIGS. 4 and 5, four) having a longitudinal dimension running co-directionally with a central axis A' of the toy, and which are circumferentially spaced-apart about the central axis A' (each equally spaced circumferentially 90° apart in the depicted example) and having at least structural portions located radially outward from the central axis A'. In a particularly advantageous variant of this embodiment, outermost edges of the members are shaped to collectively describe a generally spherical envelope, as shown in the particular example depicted. At least one hand-grasping region (preferably two, as shown) is provided, advantageously, though not necessarily, through which the central axis A' passes, and more advantageously in the form of a rod-shaped handle 22 (preferably two rod-shaped handles 22, as shown in the example) longitudinally aligned with the central axis A'. Each of the members 21 and the handles 22 are mutually secured, either by integral molding, fabrication, or assembly. Radially outward portions 21a of the members 21 are extended outward from a center C of the toy 20 in the axial direction such that they extend past an axial position of an inwardmost end of the handle 22a, thereby at least partially shielding the handles 22, such that the handles 22 serve to provide the animal restricted regions. In a preferred case, two handles 22 disposed in opposed positions along the central axis A' are provided (as shown in FIG. 4), and terminal ends 21b of the members 21 extend approximately to an axial position P corresponding to outwardly facing terminal ends 22b of the handles 22, thereby advantageously shielding handles 22 over a major, or substantially entire, portion of their axial extent. In the presently described embodiment, the circumferentially spaced-apart members 21 each presents an animal access region, particularly accessible by the animal at the radially outward portions 21a of the members 21.

It should be noted that by virtue of the geometry of this depicted embodiment of FIGS. 4 and 5, the toy 20 is self-righting, i.e., when tossed onto a relatively horizontal surface, the toy 20 will come to rest with the handles (and central axis A') extending horizontally, and generally parallel with the support surface. This feature provides particular advantage, since when thrown during, for example, fetch play, the toy 20 will right itself in this manner, thereby orienting the circumferentially spaced-apart members 21, each which presents an animal access region, in a raised position from the ground so as to be particularly accessible by the animal. It is noted that by selecting an appropriate center of gravity, alternative toy designs having other configurations can incorporate this self-righting feature.

Figure 6:
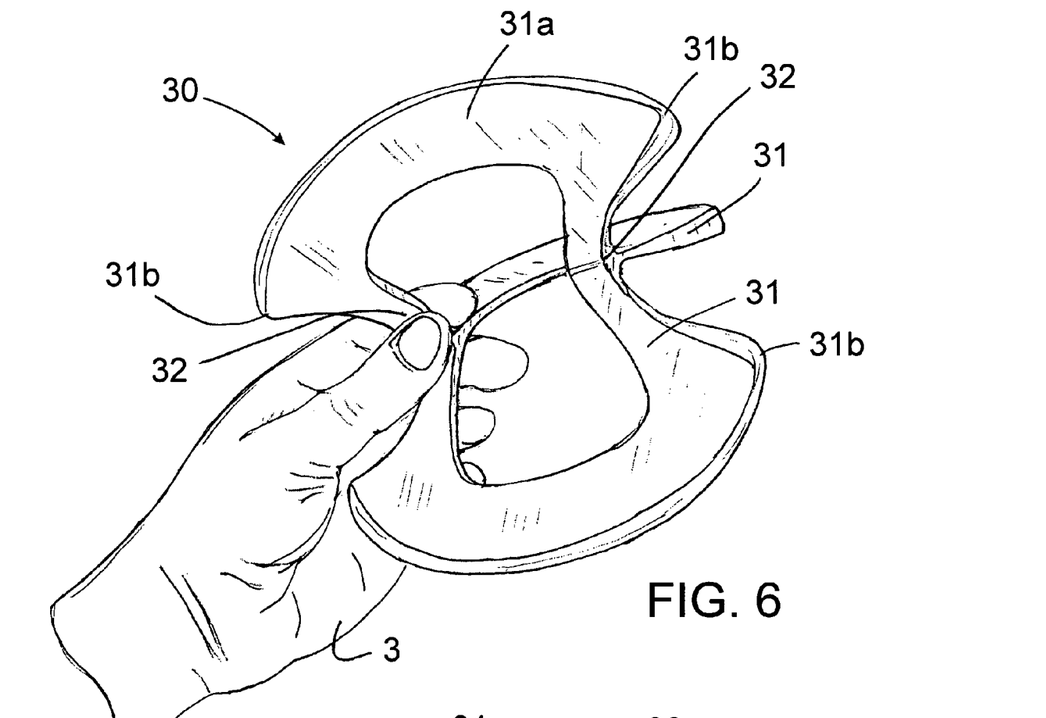
FIG. 6 is a perspective view of a variant of the basic embodiment of FIGS. 4 and 5 in which formal handle structure is omitted, shown being held in a hand of a user.
Figure 7:
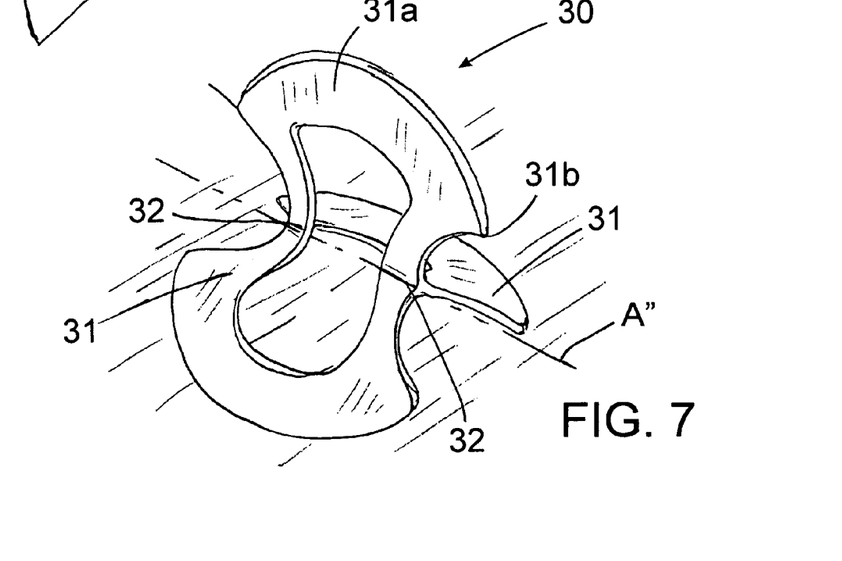
FIG. 7 is a perspective view of the embodiment of FIG. 6 shown in a resting position on the ground.

Gripping regions, shown in the depicted example in the form of handles 22, and which provide the animal restricted regions, need not be in the form of formal handle structure as in the present example, but instead may rather simply be comprised of a hand-retainable region accessible by a hand of a user, which region is at least partially shielded by the terminal end structure of the members 21 providing the animal access regions. An example of such embodiment is depicted in FIGS. 6 and 7, in which an alternate toy embodiment is depicted, generally at 30.

Toy 30 includes three members 31 spaced apart circumferentially about a central axis A''. In the example shown, although not essential to practice of the invention, the members are equally spaced circumferentially by angular intervals of 120°. The present embodiment is made in general accordance with the above-discussed considerations as the prior-described embodiment, and therefore description of analogous features need not be repeated, and only the notable differences will be addressed. In the embodiment, formal handles are omitted, and hand gripping regions 32 are instead provided at a juncture of the members 31 where they meet at the central axis A'' in a position axially inward of (i.e., recessed back from) terminal ends 31b of the members 31, whereby the extended portions of members 31 proximate to the terminal ends 31b thereof partially shield access by the animal to the gripping regions 32 which thereby serve to provide the animal restricted regions.

Figure 8:
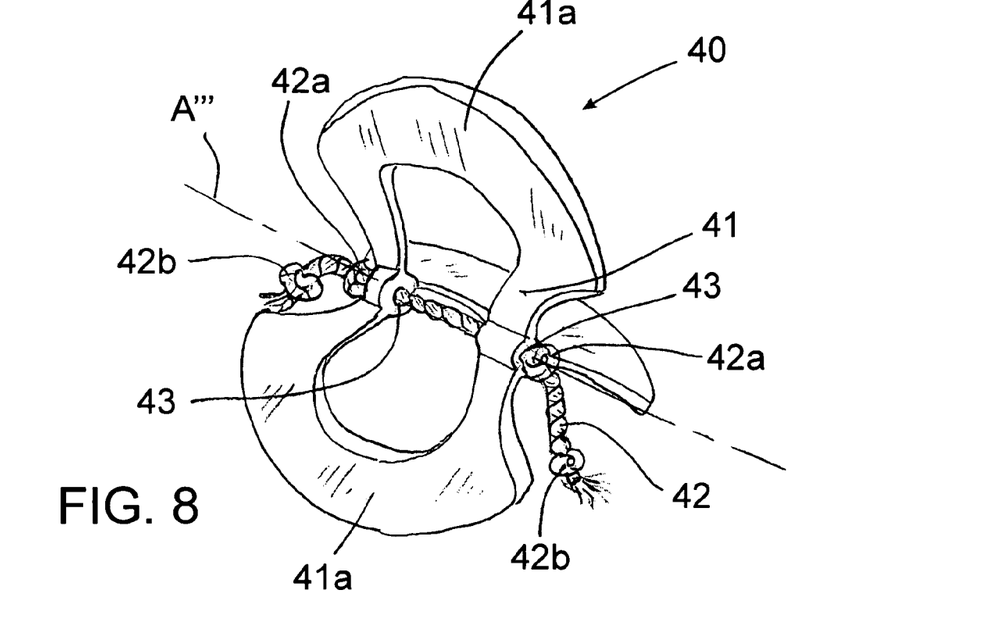
FIG. 8 is a perspective view of a further variant of the basic embodiment of FIGS. 4 and 5, in which handles are constructed of rope.

It is noted that, alternative to a rod-like handle or a simple gripping region as described above, any number of other suitable configurations can be used in satisfactory manner to satisfy the spirit of the invention. For example, as depicted in FIG. 8, another embodiment of a toy is shown, generally designated 40. Toy 40 is the same in form as the embodiment of FIGS. 6 and 7, and description relating to analogous features, such as the members 41 (corresponding to members 21 and 31) will therefore not be repeated. However, instead of a simple gripping region being provided in a position on the toy recessed back from terminal ends of the members, holes 43 are provided in a location corresponding to the gripping regions 32 in the embodiment of FIGS. 6 and 7 through which a rope 42 is passed in general alignment with a central axis A'''. Knots 42a tied in the rope serve as convenient means for retaining the rope 42 to a remainder of the toy 40. Additional knots 42b adjacent terminal ends of the rope 42b optionally facilitate grabbing by a hand of the user. In this embodiment, the free end portions of each of the rope 42 serves as a handle providing the animal restricted regions designed to be accessed by the hand of the user and not the animal.

It is noted that in each of the embodiments of FIGS. 4-8, the members 21, 31, 41 have a cutout portion between the radially outward portions 21a, 31a, 41a thereof and the central axis A', A", A'". However, such structural feature is not deemed essential to the invention, and the members could alternatively be made as solid fin-like structures which radiate from the central axis. Additionally, such fin-like structures could optionally thicken in profile as they extend further from the axis to better provide a biting structure for the animal at the radially outermost regions most accessible by the snout of a dog.

Further examples illustrative of the vast many variations of designs possible which embody the disclosed invention are described with reference to FIGS. 9, 10 and 11. It will be understood in this context that other designs equally diverse in structure, and not shown by example, will fall within the embrace of the invention as contemplated.

Figure 9:
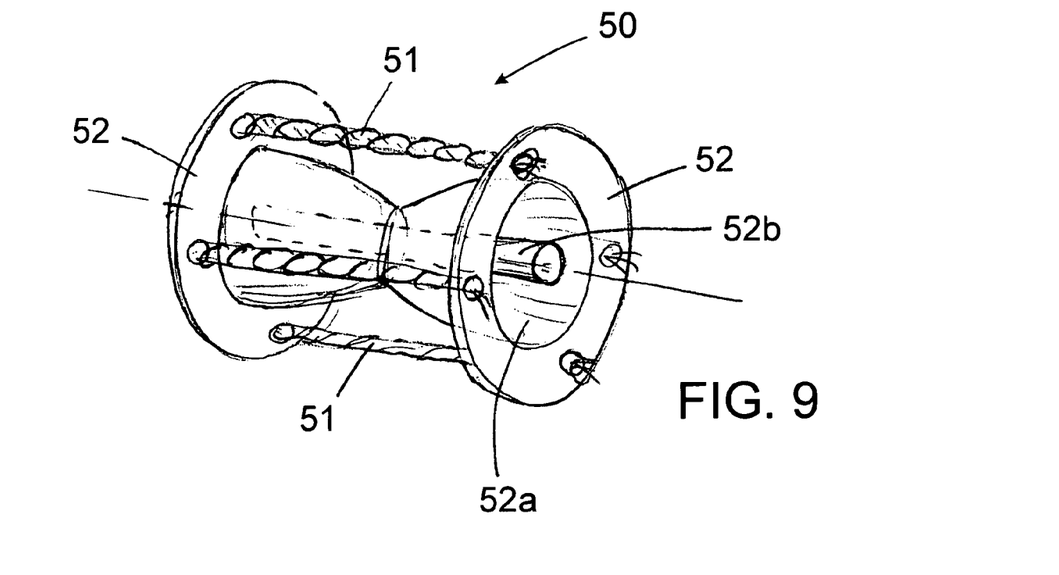
FIG. 9 is a perspective view of yet a further variant of the basic embodiment of FIGS. 4 and 5, in which the members providing animal access regions are fashioned of rope tensioned between spaced apart supports.

FIG. 9 depicts a toy, generally designated 50, which includes ropes 51 tensioned between a pair of opposed support members 52 (retained to the supports by knots or other suitable means). Support members 52 are conveniently identical and are attached to one another end to end such that cup-shaped openings 52a of the support members face in opposite directions. A handle 52b is advantageously integrally molded as part of the support member, and serves as the animal restricted region. The ropes 51, radially spaced from a central axis serve as the animal access regions.

Figure 10:
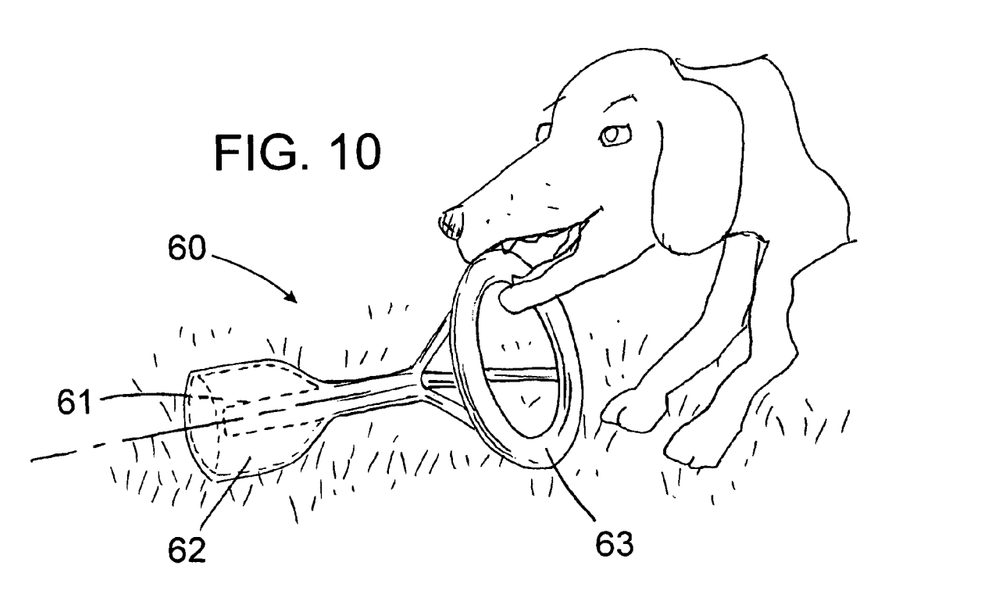
FIG. 10 is a perspective view of a further embodiment of a dog toy in accordance with the invention adapted for use as both a fetch toy and a tug toy, shown in a resting position on the ground.

FIG. 10 depicts a toy, generally designated 60, which includes a handle 61 (serving as the animal restricted region) shrouded by a shielded portion 62, and a ring portion 63 (animal access region), for typical access by a dog as shown. As with the previous embodiments, the toy 60 is made of suitable material of desired resiliency and weight.

Figure 11:
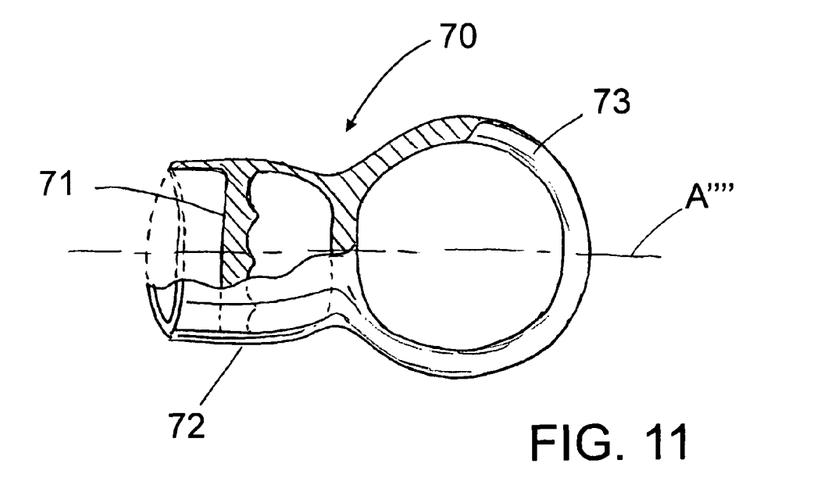
FIG. 11 is a side view shown in partial cross-section of an embodiment of a dog toy in accordance with the invention particularly well adapted for use in tug activities.

FIG. 11 depicts a toy 70, particularly suited for tug activities. In this embodiment, unlike the preceding embodiments, a handle 71 serving as the animal restricted region and shrouded by a shield 72 is disposed cross-wise to a central axis A''''. A tug ring 73 for reception in a dog's mouth, which serves as the animal access region, is disposed adjacent to the shield 72, thereby allowing interactive tug play.

In yet another embodiment, not depicted, a toy includes two regions each having a characteristic or more than one characteristic which, by virtue of a sensory response by the animal, creates a tendency for the animal to frequent one region more than another. In this regard, the characteristic in one region may be, for example, a taste preferred by the dog, and in the other region, one avoided, for example, a bitter flavor. In the alternative or in addition, smell, color, etc. may be used to discourage the dog to access an animal restricted region, and encourage access to the animal access region. In such dog toy, no particular configuration is important, and the toy may take, for example, the form of a simple rod, in which the animal access region is at one end portion and the animal restricted region on the other.

It is noted that the foregoing embodiments described above herein merely represent a few of the myriad possible structural configurations which can embody the principles of the invention. In this regard, rather than being limited to specific structural arrangements and shapes, the intended scope of the invention contemplates design of any number of toys of desired shapes and sizes which take into account any of various parameters ascertained, at present of in the future, as contributing to the likelihood that an animal will frequent one region of toy more than another.

In addition, it is further noted that other physical characteristics, in addition to those described specifically herein which exist at present or are discovered in the future as affecting animal behavior without harmful effect, may be suitably incorporated in a toy design practiced in accordance with the invention to influence an animal's proclivity to access one region (animal access region) as opposed to another (animal restricted region), and the employment of such physical characteristics in alternative toy designs is contemplated to fall within the intended scope of the claimed invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of inhibiting human user hand contact with pet saliva of a pet deposited on a play toy during interactive play by the pet and the user, comprising:

providing the toy with an animal access region and an animal restricted region, said animal access region being comprised of at least one portion of the toy which the pet is more likely to bite and hold in a mouth of the pet than at least another portion of the toy comprising said animal restricted region, when the toy is naturally picked up in the mouth of the pet, by virtue of at least one of enhanced sensory attraction or greater relative physical accessibility to the pet as compared with said animal restricted region, said animal restricted region which is comprised of said at least another portion of the toy being conversely less likely to be accessed by the pet during play than said animal access region, when the toy is naturally picked up in the mouth of the pet, by reason of at least one of less sensory appeal or structural inaccessibility to the pet as compared with said animal access region, such that saliva of the pet is deposited to at least a lesser degree on said toy within said animal restricted region as compared with said animal access region when the toy is naturally picked up in the mouth of the pet during the interactive play; and handling the toy following said toy being picked up in the mouth of the pet by grasping of the animal restricted region by the user such that contact with saliva by the user is inhibited.

2. A method according to claim 1, wherein said providing includes creating the animal restricted region by providing shielding structure which physically deters the pet from accessing said animal restricted region from access by the mouth of the pet, yet is configured to allow the hand of the human user to access the animal restricted region.

3. A method of inhibiting human user hand contact with pet saliva of a pet deposited on a toy during interactive play by the pet and the user, comprising:

providing the toy with an animal access region and an animal restricted region, said animal access region being comprised of at least one portion of the toy which the pet is more likely to bite and hold in a mouth of the pet than at least another portion of the toy comprising said animal restricted region by virtue of at least one of enhanced sensory attraction or greater relative physical accessibility to the pet as compared with said animal restricted region, said animal restricted region which is comprised of said at least another portion of the toy being conversely less likely to be accessed by the pet during play than said animal access region by reason of at least one of less sensory appeal or structural inaccessibility to the pet as compared with said animal access region, such that saliva of the pet is deposited to at least a lesser degree on said toy within said animal restricted region as compared with said animal access region when the toy is naturally picked up in the mouth of the pet, said animal restricted region including shielding structure which physically deters the pet from accessing said animal restricted region from access by the mouth of the pet, yet is configured to allow the hand of the human user to access the animal restricted region, said animal restricted region including at least one handle graspable by the hand of the human user, said at least one handle including at least a portion thereof extending longitudinally along a handle axis and said shielding structure including at least one structural portion disposed in a spaced apart radial position of said handle relative to said handle axis, at least a portion of said at least one structural portion being located so as to be coextensive with an axial positioning of said handle; and handling the toy following said toy being picked up in the mouth of the pet by grasping of the animal restricted region by the user such that contact with saliva by the user is inhibited.

4. A method of inhibiting human user hand contact with pet saliva of a pet deposited on a toy during interactive play by the pet and the user, comprising:

providing the toy with an animal access region and an animal restricted region, said animal access region being comprised of at least one portion of the toy which the pet is more likely to bite and hold in a mouth of the pet than at least another portion of the toy comprising said animal restricted region by virtue of at least one of enhanced sensory attraction or greater relative physical accessibility to the pet as compared with said animal restricted region, said animal restricted region which is comprised of said at least another portion of the toy being conversely less likely to be accessed by the pet during play than said animal access region by reason of at least one of less sensory appeal or structural inaccessibility to the pet as compared with said animal access region, such that saliva of the pet is deposited to at least a lesser degree on said toy within said animal restricted region as compared with said animal access region when the toy is naturally picked up in the mouth of the pet; and handling the toy following said toy being picked up in the mouth of the pet by grasping of the animal restricted region by the user such that contact with saliva by the user is inhibited, wherein said providing includes:

orienting an at least one structural portion in a position readily accessible by the mouth of the pet and by which the pet can hold the toy by retaining the at least one structural portion in the mouth to serve as said animal access region;

orienting an at least one grip which is hand-accessible by the user to serve as said animal restricted region; and arranging a shielding portion to at least partially discourage animal access to said at least one grip by inhibiting access of the mouth of the pet thereto, at least a portion of said grip being disposed in an axial position along a toy axis which is within an axial extent of said shielding portion along said toy axis.

5. A method according to claim 4, wherein:

said at least one structural portion includes an elongated structure extending along said toy axis between opposed ends thereof;

said at least one grip includes at least one handle disposed at at least one of said opposed ends of said elongated structure; and said shielding portion includes shielding structure at least partially disposed about said at least one handle, said shielding structure being positioned so as to be radially spaced apart from said at least one handle.

6. A method according to claim 5, wherein said shielding structure includes a generally cup-shaped shield having open ends arranged to point outward of a central region of the toy in a direction of said toy axis.

7. A method according to claim 6, wherein the shield includes cutouts therein.

8. A method according to claim 5, wherein said at least one handle includes two handles disposed respectively at the opposed ends of said elongated structure.

9. A method according to claim 4, wherein said at least one structural portion includes elements disposed in circumferentially spaced apart positions about a toy axis, said elements including at least portions thereof which are radially spaced apart from said toy axis.

10. A method according to claim 9, wherein said elements include at least three elements, at least a portion of each of the three elements extending longitudinally co-directional with said toy axis.

11. A method according to claim 10, wherein said at least a portion of said three elements which extend longitudinally are spaced apart circumferentially from one another by approximately equal angular intervals.

12. A method according to claim 10, wherein:

said at least one grip includes at least one handle of elongated dimension arranged along a longitudinal handle axis which is approximately aligned with the toy axis; and said portions of said elements which are radially spaced apart from said toy axis are extended outward from a center of the toy in an axial direction such that said portions extend past an axial position of an inwardmost end of the handle closest to said center, thereby at least partially shielding the handle.

13. A method according to claim 12, wherein said portions of said elements which are radially spaced apart from said toy axis are configured to collectively describe a generally spherical envelope.

14. A method according to claim 13, further comprising configuring the toy to be a self-righting, such that when landing onto a generally horizontal support surface, the toy is free to roll as a ball yet, will generally come to rest with the handle extending generally horizontally.

15. A method according to claim 9, wherein said providing includes integrally molding the toy.

16. A method according to claim 15, wherein the toy is comprised of a resilient material.

17. A method according to claim 3, wherein:

a toy axis passes through said at least one handle, said at least one handle being accessible by the hand of the user at least in a direction of said toy axis; and said structure at least partially physically shielding said animal restricted region from access by the mouth of the pet is at least partially defined by structural portions of said animal access regions arranged to at least partially surround at least an axially coextensive portion of said handle thereby forming a radial opening of a predetermined size in such a manner as to discourage access by the mouth of the pet to said handle when approached from a general direction along said toy axis, based upon the predetermined size of said radial opening being suitably selected to allow passage of the hand therethrough for access to said handle, but to discourage access thereof by the mouth of the pet.

18. A method according to claim 17, wherein:
said handle is defined at least partially by an elongated portion extending longitudinally codirectionally with said toy axis; and
said structural portions of said animal access regions which are arranged to at least partially surround at least the coextensive portion of said handle are extended outward from a central region of the toy in an axial direction to an axial position proximately coinciding with a corresponding axial position of a terminal end of said at least one handle.

19. A method of inhibiting human user hand contact with pet saliva of a pet deposited on a toy during interactive play by the pet and the user, comprising:
providing the toy with an animal access region and an animal restricted region, said animal access region being comprised of at least one portion of the toy which the pet is more likely to bite and hold in a mouth of the pet than at least another portion of the toy comprising said animal restricted region, when the toy is naturally picked up in the mouth of the pet, by virtue of at least one of enhanced sensory attraction or greater relative physical accessibility to the pet as compared with said animal restricted region, said animal restricted region which is comprised of said at least another portion of the toy being conversely less likely to be accessed by the pet during play than said animal access region, when the toy is naturally picked up in the mouth of the pet, by reason of at least one of less sensory appeal or structural inaccessibility to the pet as compared with said animal access region;
allowing the pet to pick up the toy by gripping a naturally-accessed portion of the toy in the mouth of the pet while the toy is free of the hand of the user; and
acquiring the toy by the user following the gripping of the toy in the mouth of the pet by grasping at least a portion of said animal restricted region by the hand of the user.

20. A method according to claim 19, further comprising:
holding the toy in said animal restricted region by the hand of the user; and
releasing the toy from the hand of the user prior to said allowing the pet to pick up the toy.

21. A method of reducing human user hand exposure to pet saliva of a pet deposited on a toy during interactive play by the pet and the user, comprising:
providing the toy with an animal access region and an animal restricted region, said animal access region being comprised of at least one portion of the toy which the pet is more likely to bite and hold in a mouth of the pet than at least another portion of the toy comprising said animal restricted region, when the toy is naturally picked up in the mouth of the pet, by virtue of at least one of enhanced sensory attraction or greater relative physical accessibility to the pet as compared with said animal restricted region, said animal restricted region which is comprised of said at least another portion of the toy being conversely less likely to be accessed by the pet during play than said animal access region, when the toy is naturally picked up in the mouth of the pet, by reason of at least one of less sensory appeal or structural inaccessibility to the pet as compared with said animal access region, such that saliva of the pet is deposited to at least a lesser degree on said toy within said animal restricted region as compared to said animal access region when the toy is picked up in the mouth of the pet by a portion of the toy freely selected by the pet during the interactive play; and
handling the toy following said toy being picked up in the mouth of the pet by grasping of the animal restricted region by the user such that exposure to saliva by the hand of the user is reduced.

22. A method according to claim 21, wherein said providing includes creating the animal restricted region by providing shielding structure which physically deters the pet from accessing said animal restricted region from access by the mouth of the pet, yet is configured to allow the hand of the human user to access the animal restricted region.

23. A method according to claim 20, further comprising configuring the toy to be a self-righting, such that when landing onto a generally horizontal support surface after said releasing, the toy will tend come to rest with at least a portion of the animal access region being oriented so as to be accessible by the pet from directly above the toy.

* * * * *